United States Patent [19]
Gross

[11] Patent Number: 4,687,281
[45] Date of Patent: Aug. 18, 1987

[54] SYNTHETIC APERTURE LASER RADAR

[75] Inventor: Richard A. Gross, Reseda, Calif.

[73] Assignee: The United States of America as represented by the Secretary of the Air Force, Washington, D.C.

[21] Appl. No.: 736,898

[22] Filed: May 22, 1985
(Under 37 CFR 1.47)

[51] Int. Cl.[4] .................. G03H 1/08; G01B 9/021
[52] U.S. Cl. ............................ 350/3.66; 356/349
[58] Field of Search ............ 350/3.66; 356/345, 347, 356/349

[56] References Cited

U.S. PATENT DOCUMENTS

| | | | |
|---|---|---|---|
| 3,572,882 | 3/1971 | Neumann | 350/3.5 |
| 3,727,219 | 4/1973 | Graham | 343/5 CM |
| 3,984,686 | 10/1976 | Fletcher et al. | 250/339 |
| 4,063,819 | 12/1977 | Hayes | 356/152 |
| 4,311,383 | 1/1982 | Ohtsubo | 356/28.5 |

OTHER PUBLICATIONS

Aleksoff, C. C., "Synthetic Interferometric Imaging Technique for Moving Objects," Applied Optics, vol. 15, No. 8, pp. 1923-1929, Aug. 1976.

Primary Examiner—Bruce Y. Arnold
Attorney, Agent, or Firm—Stanton E. Collier; Donald J. Singer

[57] ABSTRACT

A synthetic aperture laser radar outputs a dual beam that overlaps at a distant object to form a moving fringe pattern. The object reflects back a return beam to the radar where a receiver makes a holographic image of the object on a photographic medium. The moving fringe pattern effectively increases the beam size that would be necessary if a stationary fringe pattern were used when the object moves across the pattern.

5 Claims, 1 Drawing Figure

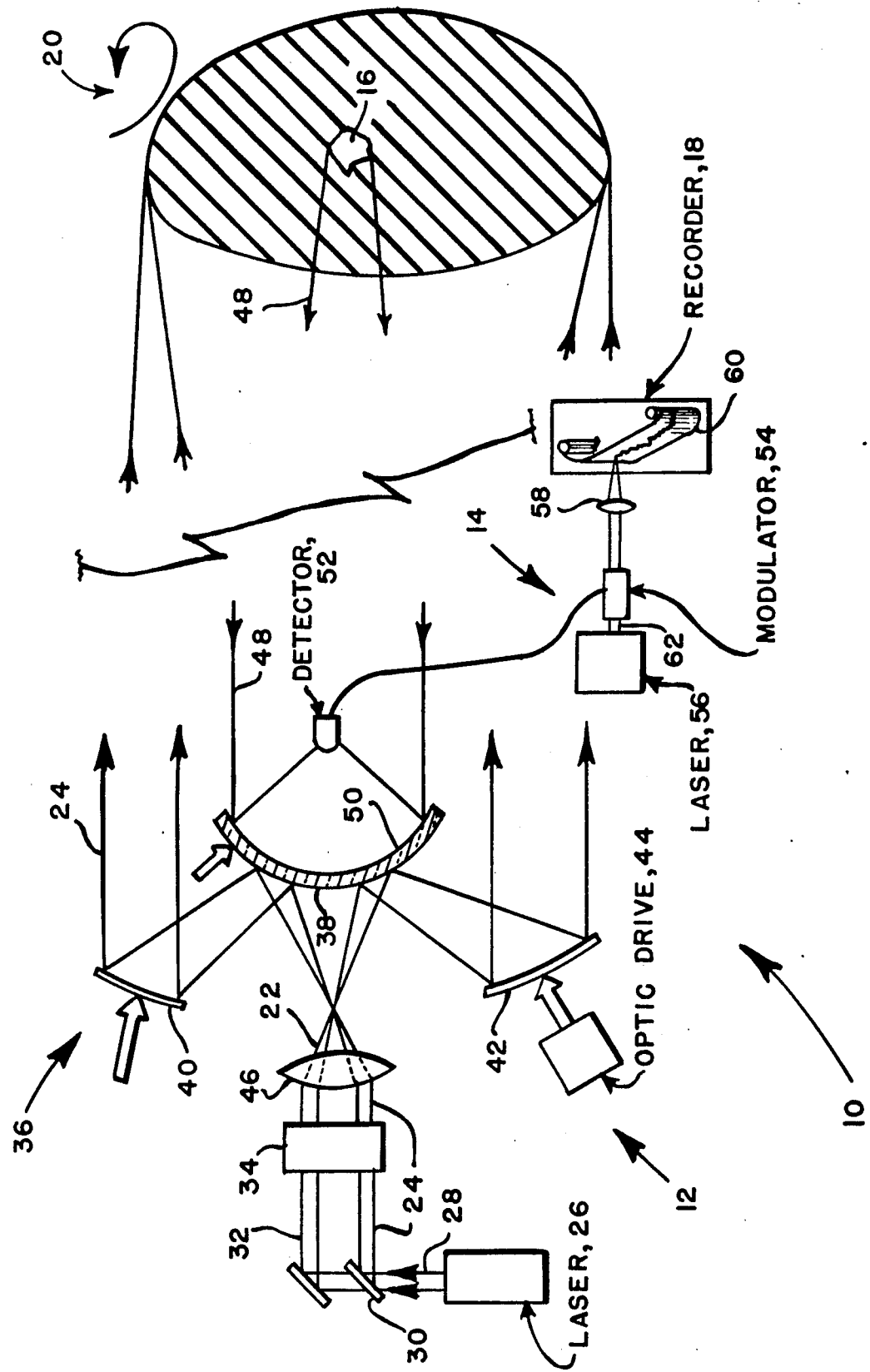

SYNTHETIC APERTURE LASER RADAR

STATEMENT OF GOVERNMENT INTEREST

The invention described herein may be manufactured and used by or for the Government for governmental purposes without the payment of any royalty thereon.

BACKGROUND OF THE INVENTION

The present invention is generally related to image forming devices, and, in particular, relates to a device for forming a holographic image of an object in space.

In a previous method, two coherent point sources are used to produce an essentially fixed interference field in space. An object moves through this field and scatters energy back to a receiver in the form of a return beam. The detected signal is recorded spatially onto a linearly moving photographic emulsion to produce a holographic image.

Since the object is moving through the fixed interference field, the field must be large in comparison to the object in order to produce sufficient information to produce a hologram. The creating of such a large field entails expanding optics and very sensitive detecting equipment to detect the weak return beam.

SUMMARY OF THE INVENTION

To obtain a hologram of an object in space, a laser beam is split into a reference beam and a phase shifted beam. These two beams are separated and expanded and projected at a tracked object. Because the phase shifted beam and the reference beam overlap near the object, a moving fringe pattern is scanned over the object as the object remains relatively stationary with respect to the moving fringe pattern. The radar receives the return beam which is processed to produce a hologram of the object scanned.

One object of this present invention is a synthetic aperture laser radar that is able to produce a hologram of relatively stationary object with a moving fringe pattern.

This and other objects and advantages of the present invention will be readily apparent to one skilled in the pertinent art from the following detailed description of a preferred embodiment of the invention and related drawings.

BRIEF DESCRIPTION OF THE DRAWINGS

The only FIGURE of the drawings is a schematic representation of the synthetic aperture laser radar of this invention.

DETAILED DESCRIPTION OF THE PREFERRED EMBODIMENT

Referring to the FIGURE, a synthetic aperture laser radar 10 has a dual beam laser transmitter 12 and a receiver 14 to record a holographic image of an object 16 in space providing a hyper-resolution image in a recorder 18. A moving fringe pattern 20 is produced by the overlap of a phase shifted beam 22 and a reference beam 24 projected from transmitter 12.

A transmitter laser 26 emits a beam 28 of a given wavelength. Beam 28 is split by beam splitter 30 into reference beam 24 and a premodulated beam 32 of about equal intensity. Beam 32 and beam 24 are input to a beam modulator 34 being a modified Michelson interferometer that changes the phase of beam 32 and outputs phase shifted beam 22 and reference beam 24. Reference beam 24 and phase shifted beam 22 are expanded and made slightly convergent by an optic train 36 being a convex reflector 38 and two concave reflectors 40 and 42.

Reference beam 24 is transmitted to object 16 without phase shift while the phase shifted beam's 22 phase is continuously shifted in order to produce the scanning fringes when two beams 22 and 24 interfere at object 16. The phase shift may be generated electro-optically or acousto-optically in the modified Michelson interferometer. In order for fringes to be observed, the two arms of the interferometer must maintain nearly equal path lengths within the coherence length of the laser. Thus, some fixed path length compensation must also be introduced in beam modulator 34.

Beam modulator 34 may induce a polarization into beam 32 through an electro-optic crystal. In order to minimize undesirable effects such as thermally induced birefringence, reference beam 24 and beam 32 are both transmitted through the crystal. This is optimally accomplished by transmitting a single polarized beam 32 through an electro-optic crystal of, for example, the 42 m crystallographic class (such as ADP or KDP). The crystal is oriented such that beam 32 propagates along the z axis and is polarized at 45° to the x and y axes. With no external electric field applied, the refractive indices, $N_i$, are given by $$N_x = N_y = N_o$$

$$N_z = N_e$$

where $N_o$ and $N_e$ are the ordinary and extraordinary refractive indices of the crystal. However, when an external electric field $\epsilon_z$ is applied along the z axis, the crystal departs slightly from its symmetric nature and the refractive indices are given by $$N_x = N_o - \tfrac{1}{2} N_o^3 r_{63} \epsilon_z$$

$$N_y = N_o + \tfrac{1}{2} N_o^3 r_{63} \epsilon_z$$

$$N_z = N_e$$

where $r_{63}$ is an element of the electro-optic tensor for the particular crystal.

Thus with no field applied ($\epsilon_z = 0$), reference beam 24 is unchanged. Specifically, the x and y components ($E_x$ and $E_y$) of the transmitted optical field (E) are identical to the incident ones $E_{ox}$ and $E_{oy}$). But when an external electric field is applied ($\epsilon_z \neq 0$), the two components of the optical field experience different refractive indices ($N_x$ and $N_y$) resulting in one being retarded with respect to the other.

The output polarizations ($E_x$ and $E_y$) of beam modulator 34 would be split using a polarizing beam splitter (e.g. a Gran-Thompson prism) and the two beams become reference beam 24 and phase shifted beam 22. Their polarization can then be rendered parallel through the use of a polarization rotator with one of them. A continuously increasing applied electric field ($\epsilon_z$) results in a continuously increasing retardation of one polarization with respect to the other thus producing the desired scanning fringes at the target.

The only difference between modulator 34 and a commercially available electro-optic modulator is that the commercial modulator requires an output polarizer oriented to block the input polarization. Changing it to one that passes but separates both polarizations allows radar 10 to use a commercial electro-optic modulator (modified to meet the environmental requirements).

However, a DC bias field is required to offset the thermally induced birefrigence resulting from absorption and environmental conditions so that a given input voltage will always result in the same amount of retardation. Commercial systems may have such a bias control but imperfections in it result in slight phase shift jitter. In addition, continuously scanning fringes are not available since there is obviously a limiting voltage that can be applied to the crystal. Thus a periodic function such as a ramp scan must be applied which adds minor complexity to the analysis electronics and introduces some potential error.

The electro-optic system produces scanning fringes by continuously and actively increasing the phase delay in one leg of a Michelson interferometer with respect to the other. However, this continuously increasing phase delay may also be produced by shifting the optical frequency of one leg of the interferometer with respect to the other.

The resulting fringes will then move continusously across the target (where the two beams are recombined) at a rate given by the difference frequency.

An electro-optic system such as that described above produces scanning fringes. An alternative preferred device is an acousto-optic system hereinafter described.

A beam that is Bragg diffracted from an acoustic wave propagating in a crystal produces a zeroth-order and a first order beam whose relative intensities are determined by the intensity of the acoustic wave. The first order diffracted beam has its optical frequency up-shifted from the incident beam by the acoustic frequency whereas the zeroth order beam experiences no change in optical frequency. This results from conservation of momentum but may be more readily viewed as Doppler scattering from the moving acoustic wave.

A commercially available acousto-optic modulator will perform in exactly this fashion with only a few minor modifications. In an AO modulator, one does not take advantage of the fact that the first order diffracted beam is frequency shifted and is usually uninterested in the zeroth order beam. In addition, the beam is generally focused for fast switching speed. For this application, the beam can remain unfocused (or perhaps slightly focused due to the 2-3 mm limiting aperture of most AO crystals). The acoustic intensity would be set to produce equal intensities in the zeroth and first order diffracted beams (since, as noted, the first order intensity is proportional to the acoustic wave intensity). The deflection angle $\alpha$ between the zeroth and first order beams is given by $$\alpha = \frac{\lambda f_o}{v}$$

where $\lambda$ is the wavelength of the light, $f_o$ is the acoustic frequency (nominally 40 MHz for glass and 80-200 MHz for $PbMoO_4$), and v is the velocity of the acoustic wave in the crystal. Thus the stability of the oscillator frequency $f_o$ is a primary factor in determining the attainable fringe stability. However, oscillator stability of one part in $10^6$ is available which would produce a $\Delta\alpha$ of 10 n rad. Distortion introduced by the crystal is the only other obvious source of fringe degradation. This has been measured to be 0.017 wave (at 647.1 nm) across a 1.5 mm dia. aperture for glass and 0.027 wave across the same aperture for $PbMoO_4$. Clearly, such distortion can be considered negligible.

An optic drive 44 positions reflectors 38, 40, and 42 so that object 16 is within the coverage of overlapping beams 22 and 24. Optic drive 44 receives drive signals from a tracking radar, not shown. A lens 46 focuses beams 22 and 24 which then diverge and are incident onto reflector 38. Although this embodiment shows one way of obtaining two beams 22 and 24 being essentially parallel, other arrangements are possible to obtain an overlap of beams 22 and 24 at the location of object 16. Because the fringes in fringe pattern 20 are moving relative to object 16, the overlap area is thus considerasbly smaller and the intensity thus greater than in other possible devices where the fringes do not move and object 16 moves through the stationary pattern.

If one assumes an output optic pupil diameter of 1 meter, having a 40% obscuration, then each of two beams 22 and 24 can have a diameter of up to 0.3 meter. The diameter of the first dark ring of the corresponding airy disc from this diameter beam, for a 0.63 $\mu$m laser 26 is given by $$w = \frac{2.44 \lambda R}{D_B}$$

or $$w = (5.124 \times 10^{-6})R \text{ meters}$$

where
R = range in meters
$D_B$ = diameter of output beam
$\lambda$ = wavelength
The distance between interference fringe peaks is $$\mu = \frac{\lambda R}{0.7 D_o}$$

or $$u = (0.9 \times 10^{-6})R \text{ meters}$$

where $D_o$ = diameter of pointer optics pupil. Thus the number of fringes achievable within the first ring of the airy pattern is $$N = \frac{2.44}{D_B} (0.7 D_o) = 1.708 \frac{D_o}{D_B}$$

For the configuration assumed,

N = 5.7 fringes

At R = 1000 km, the overall beam diameter is w = 5.1 meters, so that the fringe period is 0.9 meters. Object 16 placed in this pattern will provide a signal modulation assuming beams 22 and 24 are coherent By using a synchronous detection process, receiver 14 will be restricted to respond only to a return beam 48 reflected from object 16, thus restricting the receiver from responding to stars, earth limb, or out-of-field radiation.

Object 16 being illuminated by moving fringe pattern 20 reflects return beam 48 to a concave reflector 50 that focuses beam 48 upon a receiver detector 52. A detector signal is transmitted to a modulator 54 that causes a laser beam 62 from a receiver laser 56 to be phase shifted according to the intensity of the detector signal.

Beam 62 is focused on a moving film 60 by lens 58 to form a holographic image of object 16.

The above radar 10 would be used in satellite-to-satellite reconnaisance missions.

Clearly, many modifications and variations of the present invention are possible in light of the above teachings and it is therefore understood, that within the inventive scope of the inventive concept, the invention may be practiced otherwise than specifically claimed.

What is claimed is:

1. A synthetic aperture laser radar, said laser radar being positioned by a tracking radar, said laser radar comprising:
   a laser transmitter, said laser transmitter outputting a reference beam and a phase shifted beam having a changing phase shift delay with respect to said reference beam, said beams overlapping and forming a moving fringe pattern within a given area containing an object to be examined, said object reflecting a return beam, and
   a receiver, said receiver forming a holographic picture of said object from said return beam.

2. A synthetic aperture laser radar as defined in claim 1 wherein said laser transmitter comprises:
   a laser for outputting a continuous wave laser beam,
   beam splitting means for receiving said laser beam and outputting a reference beam and a premodulated beam of about equal intensities,
   a modified Michelson interferometer having therein means for phase shifting said premodulated beam so as to output a phase shifted beam, said modified Michelson interferometer having also input said reference beam and outputting said reference beam such that said reference beam and said phase shifted beam are equally affected except for a changing phase shift delay applied to said premodulated beam, and
   means for forming essentially two parallel beams, said parallel beams being said phase shifted beam and said reference beam, said means for forming causing said parallel beams to overlap at a given distance so as to form a fringe pattern wherein fringes move across said pattern.

3. A synthetic aperture laser radar as defined in claim 2 wherein said means for phase shifting is a modified electro-optic phase shifter.

4. A synthetic aperture laser radar as defined in claim 2 wherein said means for phase shifting is a modified acousto-optic phase shifter.

5. A synthetic aperture laser radar as defined in claim 1 wherein said receiver comprises:
   means for concentrating said return beam,
   a detector means for receiving said return beam and outputting a detector signal that contains therein phase information about said return beam,
   a light modulator for receiving said detector signal and a receiver laser beam, said light modulator outputting a modulated beam,
   a receiver laser for outputting said receiver laser beam to said light modulator,
   focusing means for receiving said modulated beam and outputting a focused modulated beam, and
   a recorder that receives said focused modulated beam and places said focused modulated beam upon a photographic medium to form a holographic image of said object.

* * * * *